(12) United States Patent
van de Wiel et al.

(10) Patent No.: US 6,497,076 B1
(45) Date of Patent: *Dec. 24, 2002

(54) MOVEABLE BUMPER FOR A LOADING DOCK

(75) Inventors: Hans van de Wiel, Drunen; Henk de Lang, Maarssen, both of (NL); Reinhard E. Sander, Wauwatosa, WI (US)

(73) Assignee: Rite Hite Holding Corporation, Milwaukee, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/552,953

(22) Filed: Apr. 20, 2000

(51) Int. Cl.[7] ............................................... E04H 14/00
(52) U.S. Cl. ...................... 52/173.2; 52/741.15; 14/71.1
(58) Field of Search ............................... 52/173.2, 2.12, 52/741.15; 414/401, 402; 404/6; 292/341.19; 14/71.1, 71.3

(56) References Cited

U.S. PATENT DOCUMENTS

| 3,203,002 A | | 8/1965 | McGuire ..................... 14/71.3 |
| 3,375,625 A | * | 4/1968 | Edkins et al. ............... 52/173.2 |

(List continued on next page.)

FOREIGN PATENT DOCUMENTS

| CH | 685177 A5 | 3/1995 | |
| DE | 2800128 A1 | 5/1979 | |
| DE | 296 00 207 U1 | 11/1996 | |
| DE | 19612135 A1 | 2/1997 | |
| DE | 29716877 U1 | 2/1998 | |
| DE | 2980411 | 5/1998 | ........... E01F/15/14 |
| EP | 0040388 A1 | 12/1981 | |
| FR | 2686913 | 8/1993 | ........... E01F/1/00 |
| GB | 1161537 | 8/1969 | |

OTHER PUBLICATIONS

International Search Report corresponding to International Patent Application Serial No. PCT/US01/40531, dated Aug. 29, 2001, 7 pages.

Hafa GmbH Technical Drawing, "Hohenbeweglicher Anfahrpuffer" dated Nov. 1995, 1 page. English abstract attached to document.

International Search Report concerning International Application Ser. No. PCT/US99/14867, European Patent Office, dated Mar. 11, 1999, 8 pages.

Drawing "Adjustable Bottom Pad (692–0029)", dated Oct. 17, 1985, showing a vertically adjustable pad mounted to the dock face.

Spec Sheet "Loading Systems Mobile Dock Bumper RB 250M", dated circa 1993, showing a vertically–adjustable spring–loaded dock bumper.

Primary Examiner—Robert Canfield
Assistant Examiner—Naoko Slack
(74) Attorney, Agent, or Firm—Marshall, Gerstein & Borun

(57) ABSTRACT

A bumper assembly for a loading dock includes a bumper that is moveable between an operative position and a stored position. In the operative position, the bumper extends well above the dock platform to prevent excessively high trucks, trailer beds, and cargo containers from being parked over the top of the dock platform. In the stored position, the bumper is positioned so as not to obstruct loading and unloading of cargo. In some cases, the bumper is biased to the operative position to encourage operators to normally leave the bumper in that position. In some embodiments, the bumper is selectively moveable away from the vehicle or container that the bumper is blocking to facilitate subsequently moving the bumper to its stored position.

19 Claims, 14 Drawing Sheets

U.S. PATENT DOCUMENTS

| | | | | |
|---|---|---|---|---|
| 3,440,673 A | | 4/1969 | KKelley | 14/71.3 |
| 3,493,984 A | | 2/1970 | Reinhard | 14/71.3 |
| 3,570,033 A | | 3/1971 | Hovestad et al. | 14/71.3 |
| 3,644,952 A | * | 2/1972 | Hatch | 14/71 |
| 3,665,997 A | * | 5/1972 | Smith et al. | 160/41 |
| 3,840,930 A | | 10/1974 | Wanddell | 14/71.3 |
| 3,921,241 A | | 11/1975 | Smith | 14/71.3 |
| 4,420,849 A | | 12/1983 | Alten | 14/71.3 |
| 4,682,382 A | | 7/1987 | Bennett | 14/71.3 |
| 4,744,121 A | | 5/1988 | Swessel et al. | 14/71.3 |
| 5,088,143 A | | 2/1992 | Alexander | 14/69.5 |
| 5,450,643 A | | 9/1995 | Warner | 14/71.3 |
| 5,452,489 A | | 9/1995 | Gelder et al. | 14/69.5 |
| 5,644,812 A | | 7/1997 | Neufeldt et al. | 14/71.3 |
| 5,651,155 A | | 7/1997 | Hodges et al. | 14/71.3 |
| 5,658,633 A | | 8/1997 | Di Biase | 428/68 |
| 5,775,044 A | | 7/1998 | Styba | 52/173.2 |
| 5,832,554 A | | 11/1998 | Alexander | 14/71.1 |
| 5,881,414 A | | 3/1999 | Alexander | 14/71.3 |
| 5,996,291 A | | 12/1999 | Styba | 52/173.2 |
| 6,006,389 A | | 12/1999 | Alexander | 14/71.1 |
| 6,070,283 A | | 6/2000 | Hahn | 14/71.1 |
| 6,360,394 B1 | | 3/2002 | Hahn | 14/71.1 |

\* cited by examiner

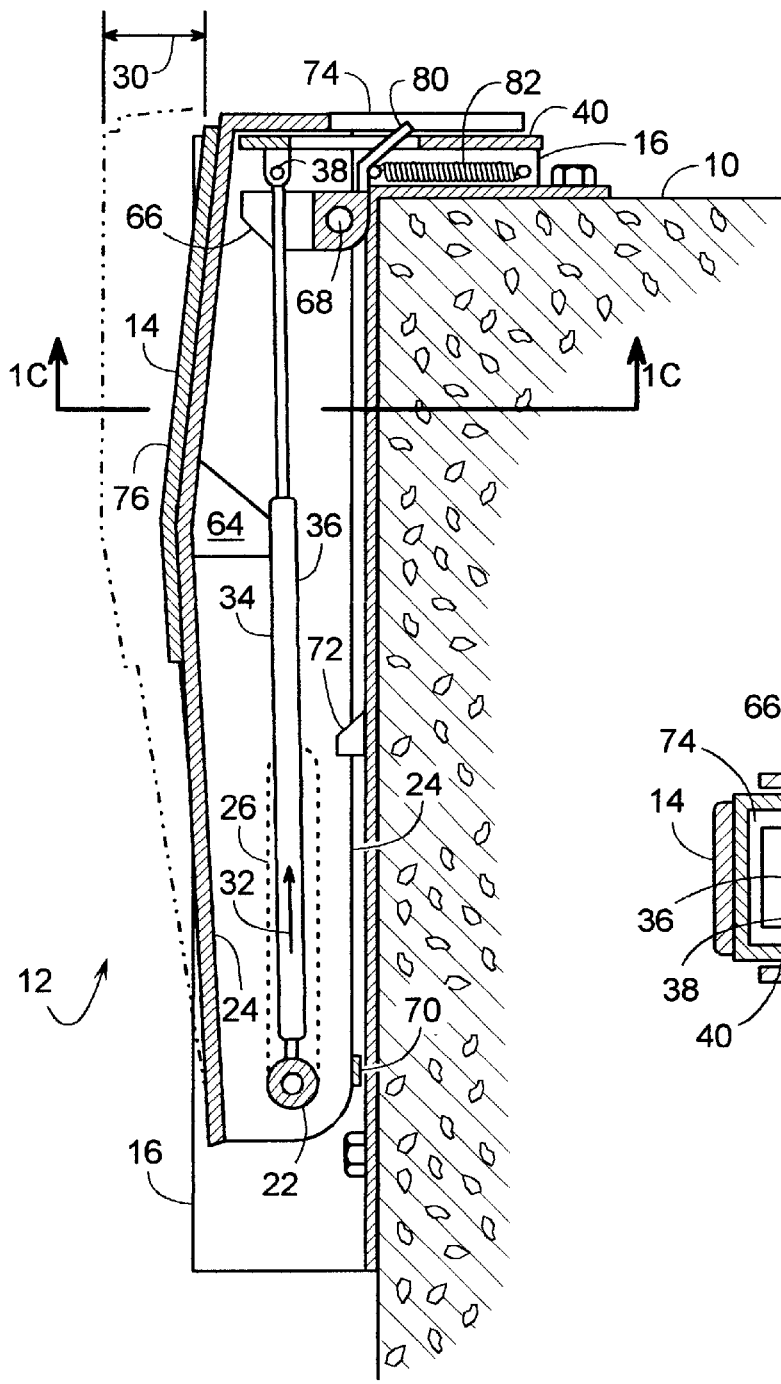
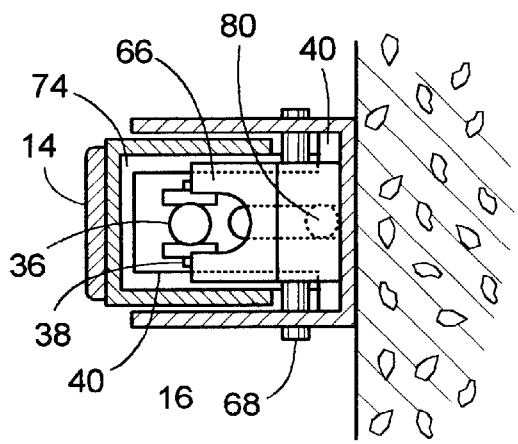

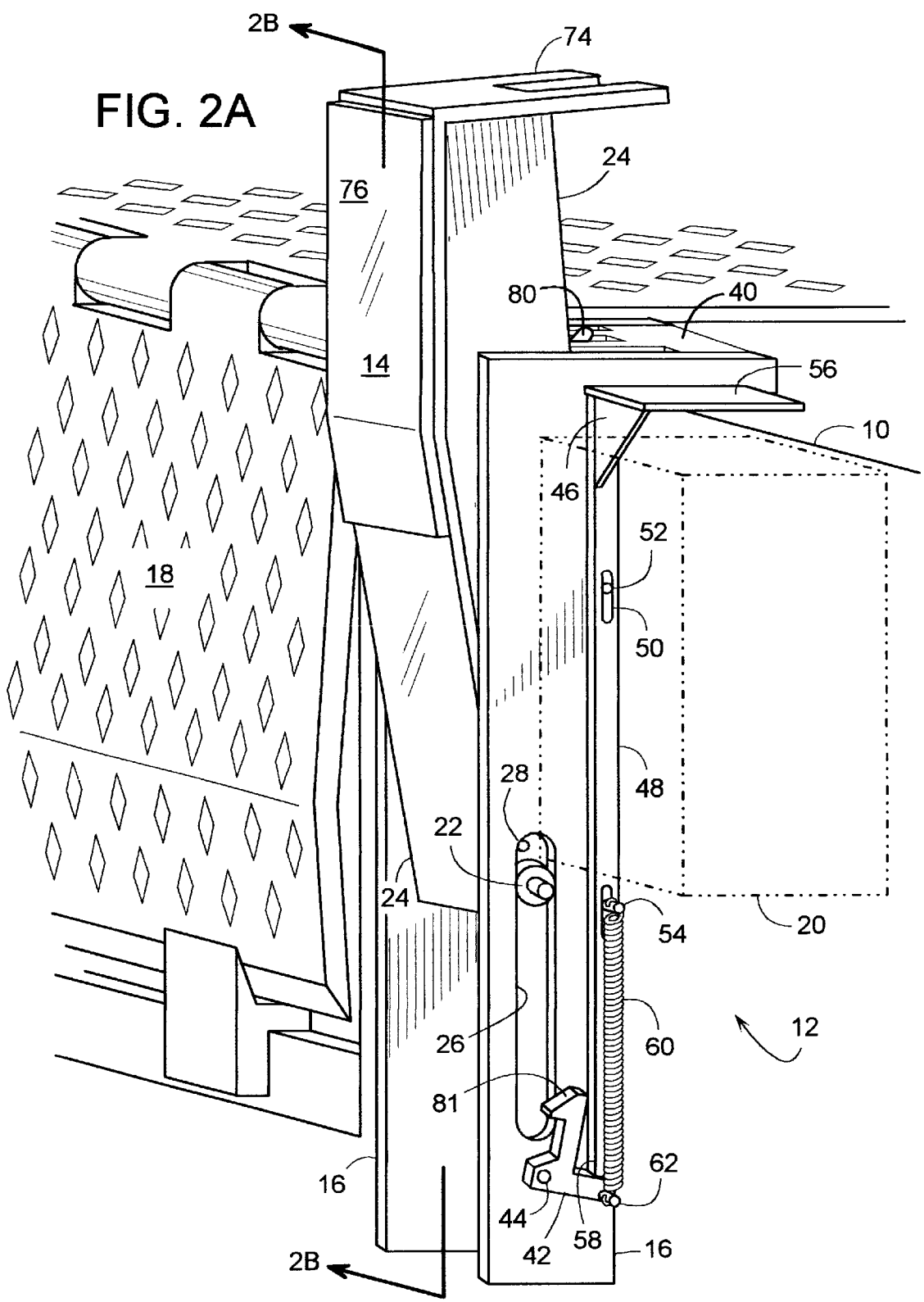

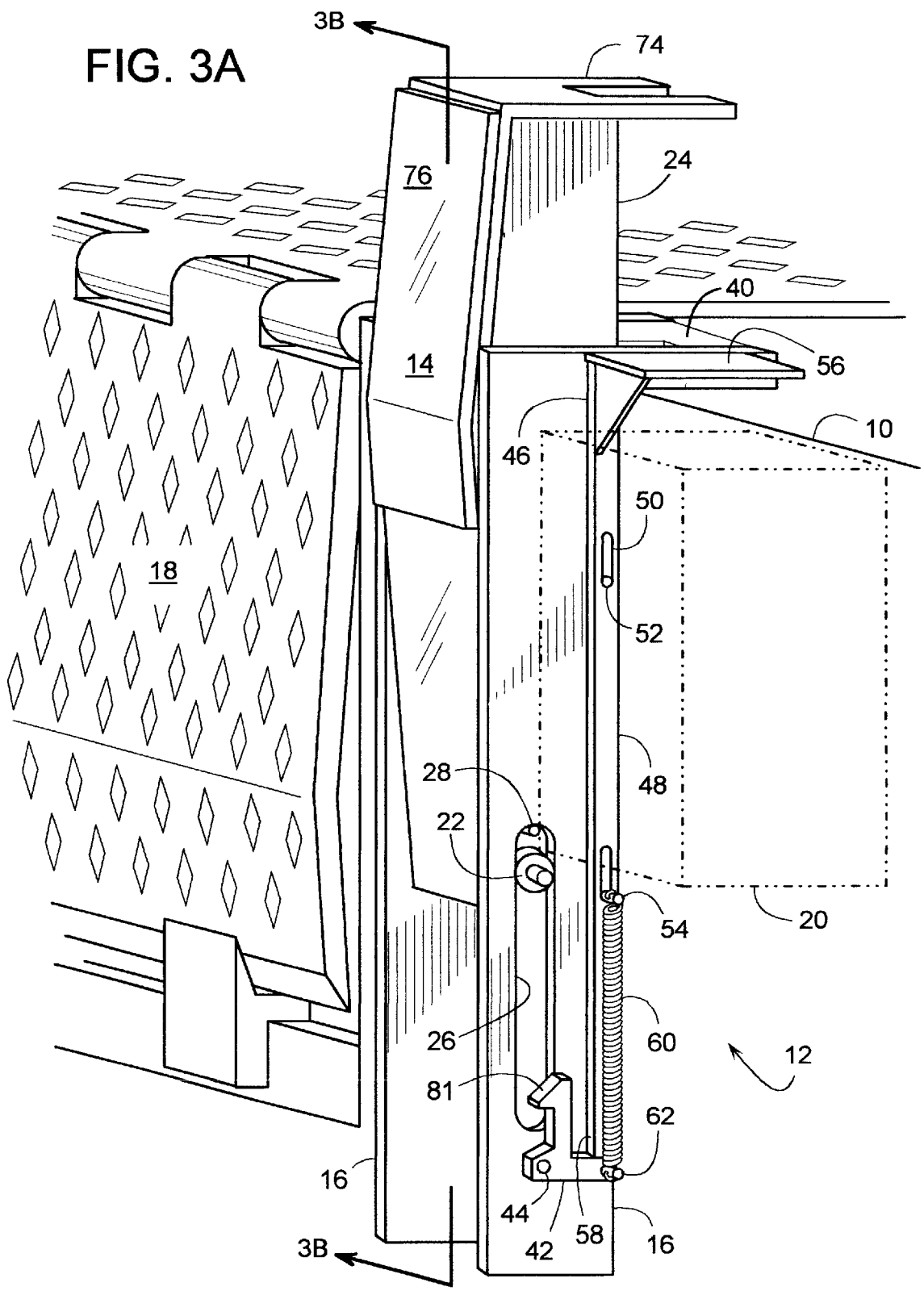

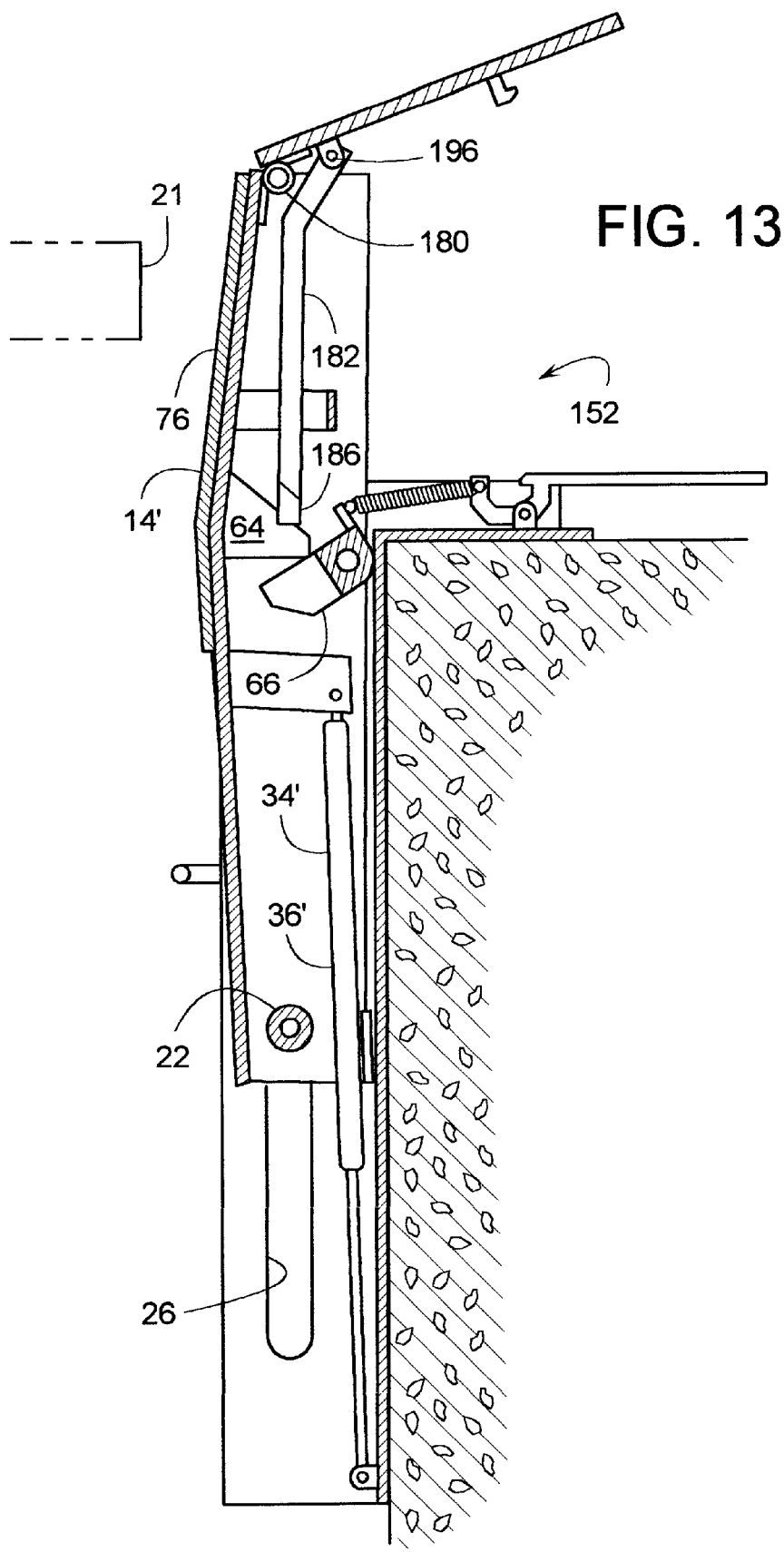

ved above the dock platform, thus the bumper's frame remains an obstruction. The '117 reference discloses a raised
MOVEABLE BUMPER FOR A LOADING DOCK

BACKGROUND OF THE INVENTION

1. Field of the Invention

The subject invention generally pertains to dock bumpers and more specifically to a moveable dock bumper.

2. Description of Related Art

A loading dock provides a platform of a height roughly equal to that of an average truck trailer bed. This allows forklifts and other pallet carriers to readily transfer cargo between the dock and the trailer bed. Since trailer bed heights vary, the loading dock usually includes a dock leveler that provides an adjustable ramp to accommodate the various heights. When a truck backs into the dock, bumpers mounted adjacent the dock leveler are often used to help prevent the rear of the trailer bed from damaging itself or items associated with the dock, such as a door or door frame. Such bumpers create a gap between the dock and the rear of the trailer bed, thus dock levelers usually include a lip extension that bridges the gap.

In some cases, a truck or trailer bed may be excessively high, or a truck may deliver a swap body or similar cargo container to the dock. A swap body is a large container designed to be carried upon the trailer of a truck, or on a ship or railroad car. Swap bodies often have four self-supporting legs that store when in transit, and deploy when left at a loading dock. When delivered to a dock, swap bodies are often too high to catch a conventional dock bumper whose top is generally flush with the dock platform. Thus, the delivery of swap bodies are known to damage docks as well as the swap bodies themselves. The same is true for trucks and trailer beds that are excessively high.

A dock-mounted bumper extending several inches above the platform could prevent such damage, but the raised bumper could also obstruct loading and unloading. Although forklifts and pallet carriers themselves are capable of avoiding a raised bumper, the presence of pallets and/or their load on the fork truck may limit this capability, as they may need to be lifted up and over the bumper in order to be placed to either rear side of the trailer bed or swap body. If there is sufficient head clearance within the truck or swap body, a forklift can lift a pallet up and over a raised bumper. However, many pallet carriers can only lift a pallet a couple of inches off the floor, thus the rear sides of the trailer bed or swap body can become virtually inaccessible.

Some raised bumpers are moveable, such as those disclosed in French Patent 2686913 and German Patent 29804117; however, they have their drawbacks. Although the '913 bumper raises and lowers, its support frame remains extended above the dock platform, thus the bumper's frame remains an obstruction. The '117 reference discloses a raised bumper that can slide off to one side. However, once a swap body is leaning tightly up against the bumper, it may be difficult to overcome the friction between the swap body and the face of the bumper, thus making it difficult to reposition the bumper. The same problem could occur if a truck backs its trailer bed tightly up against the bumper.

SUMMARY OF THE INVENTION

To accommodate truck trailers and swap bodies of various height, a loading dock is provided with a bumper that is moveable between an operative position and a stored position, wherein upon moving from the operative position to the stored position, the bumper moves in a direction that traverses an abutment face of the bumper.

In some embodiments, the bumper lowers upon moving from its operative position to its stored position.

In some embodiments, the bumper is able to swing away from a truck, trailer, or container that may be parked up against the bumper.

In some embodiments, the bumper swings about a substantially horizontal axis.

In some embodiments, the bumper swings about an axis that traverses a horizontal plane.

In some embodiments, the bumper can rise above a frame that supports the bumper.

In some embodiments, the bumper is mechanically urged toward its operative position.

In some embodiments, the movement of the bumper is foot-actuated.

BRIEF DESCRIPTION OF THE DRAWINGS

FIG. 1B is a cross-sectional view taken along line 1B—1B of FIG. 1A.

FIG. 1C is a cross-sectional view taken along line 1C—1C of FIG. 1B.

FIG. 2A is a perspective view of the moveable bumper of FIG. 1A, but shown in its operative position.

FIG. 3A is a perspective view of the moveable bumper of FIG. 2A, but with the bumper released of its operative position and in a retracted position.

FIG. 13 is similar to FIG. 3B, but of another embodiment.

DESCRIPTION OF THE PREFERRED EMBODIMENT

Figure 1A:
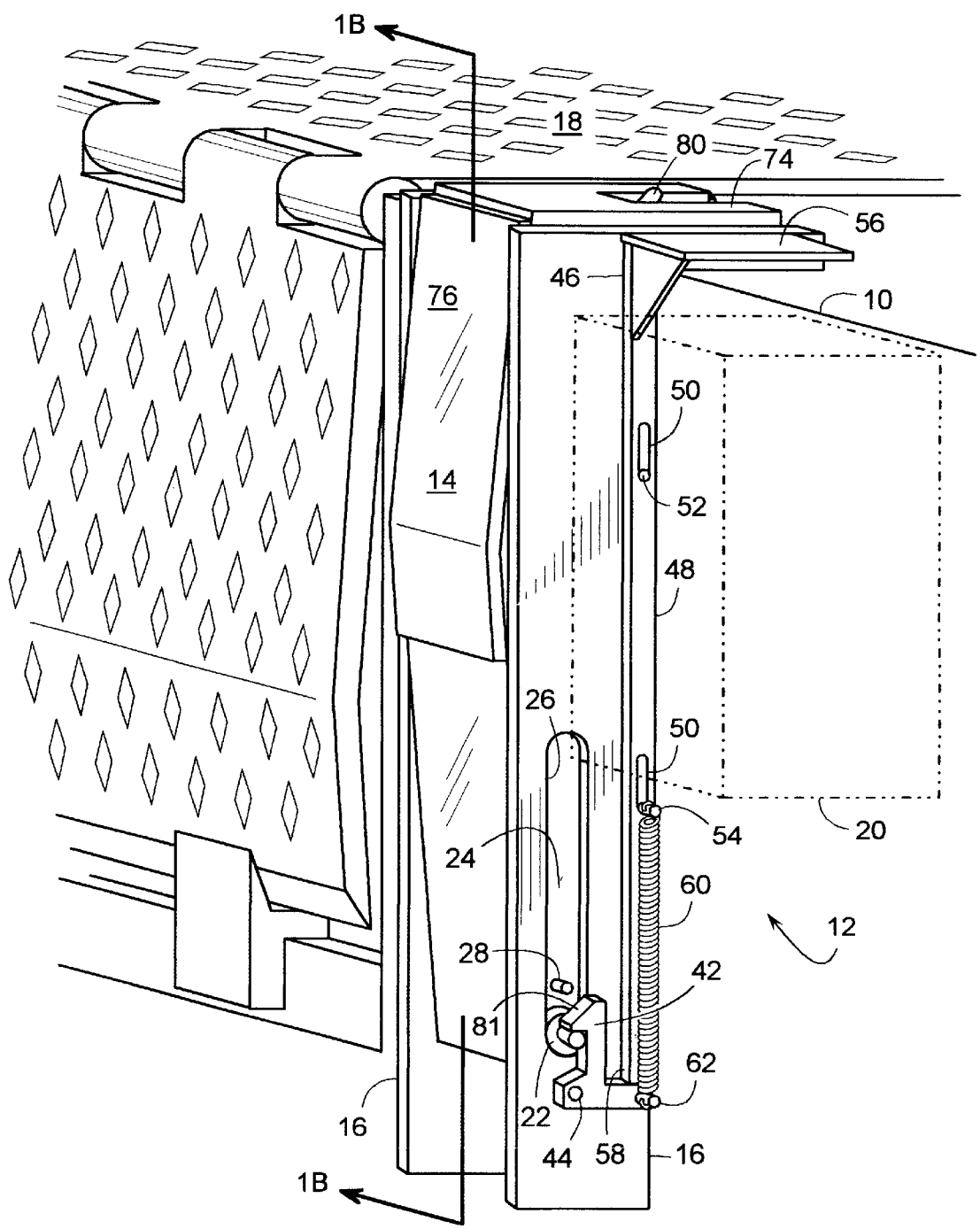
FIG. 1A is a perspective view of one embodiment of a moveable bumper in a stored position.

To accommodate a cargo carrier 21, such as trucks, trailers and swap body containers of various heights, a loading dock platform 10 is provided with a bumper assembly 12 having a moveable bumper 14, as shown in FIGS. 1A and 1B through 3A and 3B. In this embodiment, bumper assembly 12 includes a bumper frame 16 (a generally U-shaped channel) that is anchored to dock 10, preferably between a dock leveler 18 and a conventional bumper 20, although bumper assembly 12 can be used without conventional bumper 20. Even so, here the conventional bumper 20 helps prevent trucks and trailers of low or standard height from backing up against the building or getting so close as to obstruct the operation of dock leveler 18; while bumper 14, being moveable relative to frame 16, is able to rise above platform 10 to help prevent higher vehicles and swap body containers from backing up and over dock platform 10. FIGS. 1A and 1B show bumper 14 in its lowered, stored position, while FIGS. 2A and 2B show bumper 14 in its raised, operative position.

To guide the vertical movement of bumper 14 relative to frame 16, a pin 22 extending from a mounting surface 24 of bumper 14 slides within a slot 26 in frame 16. A smaller second pin 28 extending from bumper 14 also moves within the constraint of slot 26 to limit the extent to which bumper 14 may swing outward from frame 16. In some embodiments, pin 28 limits the outward movement of bumper 14 to about one or two inches, as indicated by dimension 30. If desired, pin 28 may serve as a replaceable weak link should bumper 14 ever be forced outward beyond its normal limit.

In some embodiments, bumper 14 is urged to its operative position by a force 32 that is provided by at least one of a mechanical spring force, a gas spring force, gravity, hydraulic actuation, pneumatic actuation, and electromotive actuation. For example, in one embodiment, force 32 is provided by an actuator 34, such as a normally retracted gas spring 36 that connects pin 22 of bumper 14 to a stationary point 38 on plate 40 of bumper frame 16 (see FIG. 1C). Actuator 34 is schematically illustrated to represent any type of powered actuator such as those employing hydraulic, pneumatic, or electromotive actuation, and to further represent any type of non-powered spring.

To hold bumper 14 at its stored position against the urging of force 32, a latching mechanism is employed, specifically latch 42 engages pin 22. Pivoting latch 42 counterclockwise about a pin 44 releases pin 22, which allows actuator 34 to lift bumper 14 to its raised, operative position. The actuation of latch 42 can be carried out by numerous devices including, but not limited to, a solenoid, a pneumatic or hydraulic cylinder, or a linkage mechanically coupling the operation of the bumper to that of dock leveler 18 or the movement of a vehicle at dock 10. However, in one embodiment, a foot-actuated release mechanism 46 operates latch 42. Release mechanism 46 includes a bar 48 having slots 50 that slidingly engage pins or bolts 52 and 54 that protrude from frame 16. Pushing down on a foot-receiving member 56 extending from the top of bar 48 moves a lower end 58 of bar 48 to release latch 42. A tension spring 60 connecting pin 54 to a pin 62 urges bar 48 upward and latch 42 counterclockwise. It should be noted that although in some embodiments mechanism 46 and member 56 are foot-actuated, actuation can also accomplished by a variety of other actions including, but not limited to, an overhead door descending to a closed position. Using a door for actuation could automatically raise a bumper as the door closes.

As actuator 34 lifts bumper 14, an angled protrusion 64 on mounting surface 24 engages an angled block 66 that is pivotally connected to frame 16 by way of a pin 68. Protrusion 64 engaging block 66 forces bumper 14 outward. The upper movement of bumper 14 can be limited by any one of a variety of travel limiting devices, such as the travel limit of actuator 34 itself or a cross bar 70 on mounting surface 24 engaging a stop 72 that is disposed on frame 16.

Figure 2B:
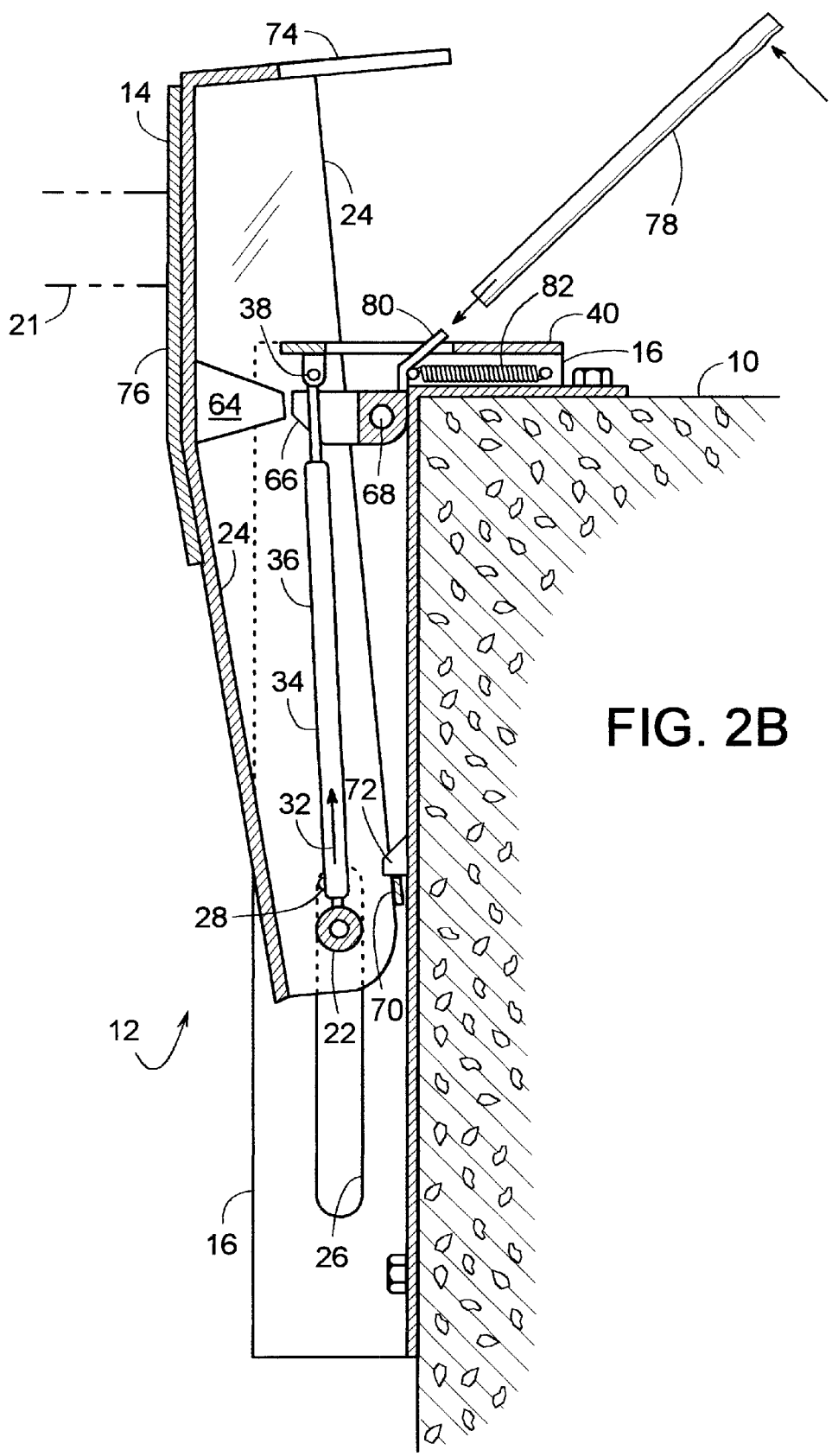
FIG. 2B is a cross-sectional view taken along line 2B—2B of FIG. 2A.

From the raised, operative position of FIGS. 2A and 2B, bumper 14 can be returned to its stored position by a powered actuator 34 or by the application of a manual force, such as by pushing down against a foot-receiving member 74 on bumper 14. However, if a vehicle or swap body is parked tightly up against an abutment face 76 of bumper 14, the resulting pressure against bumper face 76 may make it very difficult to move bumper 14 from its position of FIGS. 2A and 2B directly to its stored position of FIGS. 1A and 1B. Thus, bumper 14 may first need to be moved to a retracted position away from the parked vehicle or swap body.

Figure 3B:
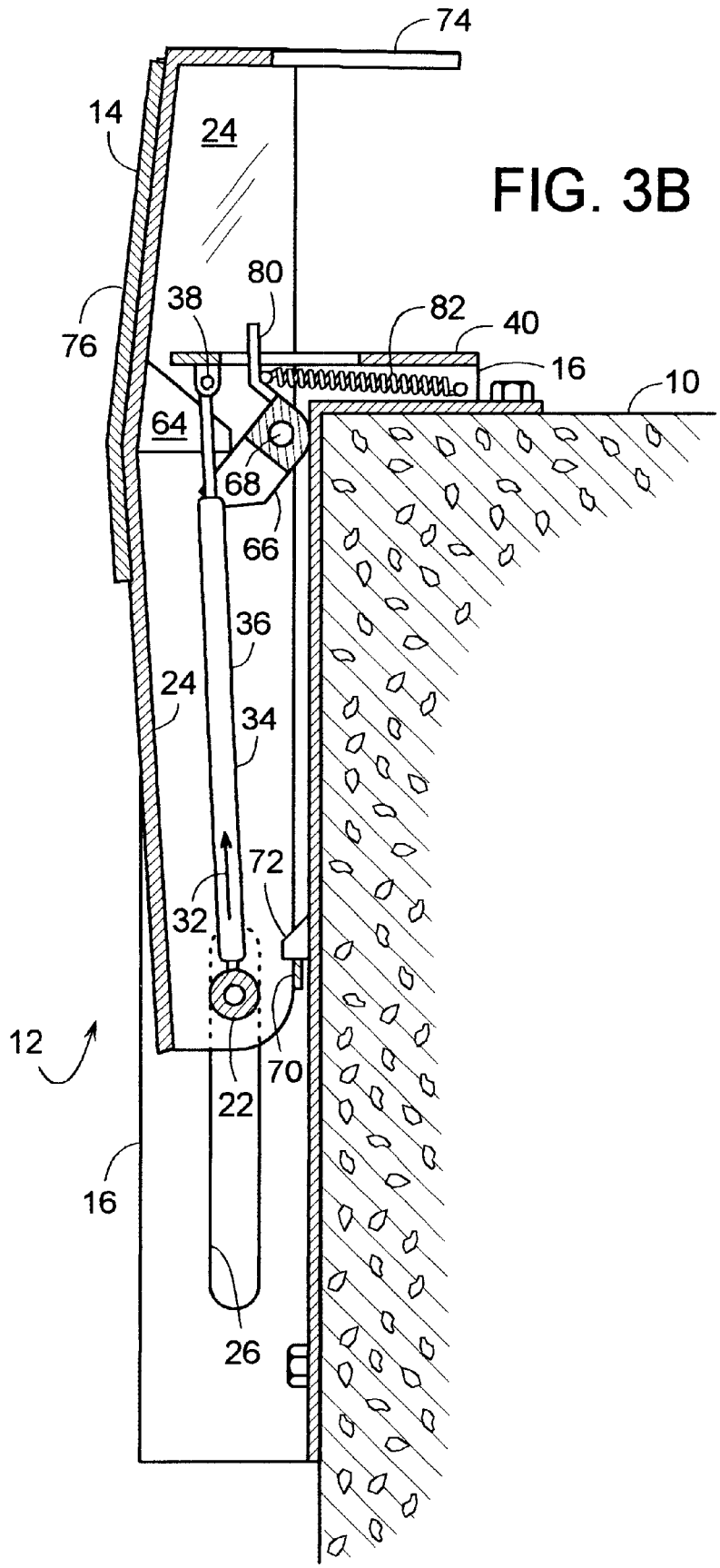
FIG. 3B is a cross-sectional view taken along line 3B—3B of FIG. 3A.

To do this, bumper 14 is moved in a direction that traverses bumper face 76 (in this case, in a rearward direction relative to the vehicle) by first pivoting block 66 downward, away from protrusion 64, as shown in FIGS. 3A and 3B. If desired, a manually held pipe 78 (FIG. 2B) temporarily engaging a short lever 80 on block 66 can help provide the necessary leverage to manually rotate block 66. With bar 66 pivoted downward and disengaged from protrusion 64, bumper 14 is now free to move back and away from the vehicle or container that may be parked at dock 10. Once the pressure on the abutment face 76 is released, bumper 14 is readily pushed back down to its stored position by applying downward pressure against foot-receiving member 74. A tapered portion 81 of latch 42 allows pin 22 to snap underneath latch 42, which holds bumper 14 in its stored position after pressure on foot-receiving member 74 is released. A tension spring 82 urges block 66 to its position shown in FIG. 1B.

A release mechanism is thus provided which, in this embodiment, comprises a block 66 and protrusion 64. In a first, non-release configuration (FIG. 2B), the release mechanism prevents the bumper 14 from moving in a direction that traverses the bumper face 76 (i.e. in a rearward direction relative to the vehicle). In the non-release configuration, the release mechanism may also provide a load path for reacting the force applied by the vehicle to the bumper back into a fixed structure such as the loading dock. The release mechanism also has a second, release configuration (FIG. 3B) in which it permits movement of the bumper 14 in a rearward direction—so that the retracted bumper can be returned to a stored position. In this embodiment, the release mechanism is configurable between its first, support configuration and its second, release configuration by virtue of rotation of block 66 about pin 68. This rotation is facilitated by use of lever 80 acting on block 66.

In operation, bumper 14 is normally left in its raised, operative position of FIGS. 2A and 2B. After a vehicle or container is parked against bumper 14 or 20, the release mechanism can be placed in its release configuration by block 66 being rotated to release the pressure against bumper 14 and allow bumper 14 to be pushed back down to its stored position of FIGS. 1A and 1B. Since the remaining presence of a bumper above the loading dock surface would otherwise be an impediment to the loading process, the ability of the present bumper to be released and return to a stored position (even when pressure is being applied to the bumper face) is a valuable feature of this design, and (in part) distinguishes this design over those non existing. The vehicle or container is then loaded or unloaded as needed. After the vehicle departs or the container is removed, an operator steps on foot-receiving member 56 to allow bumper 14 to return to its raised, operative position of FIGS. 2A and 2B.

Figure 4A:
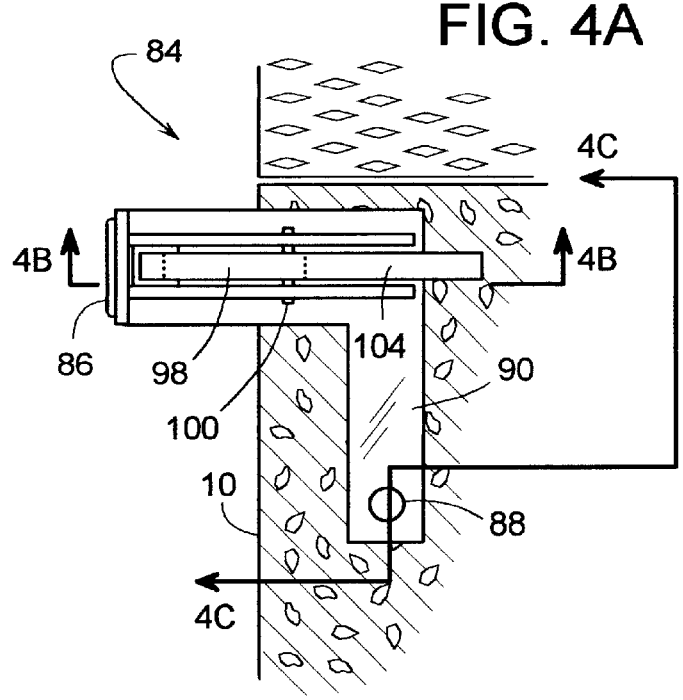
FIG. 4A is a top view of another embodiment of a moveable bumper in an operative position.
Figure 4B:
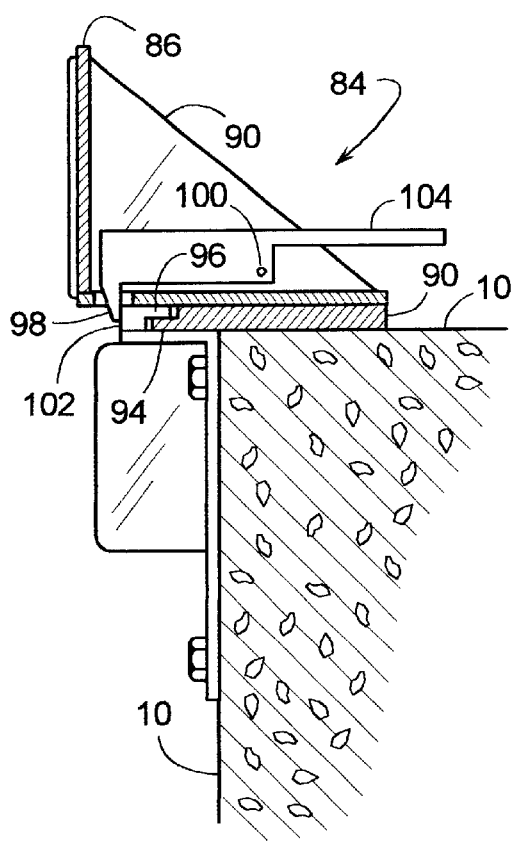
FIG. 4B is a cross-sectional view taken along line 4B—4B of FIG. 4A.
Figure 4C:
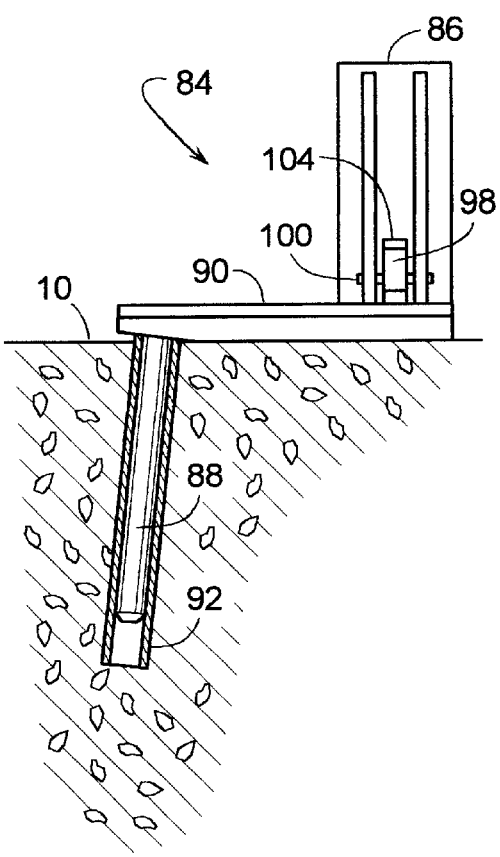
FIG. 4C is a partial cross-sectional end view taken along line 4C—4C of FIG. 4A.
Figure 5A:
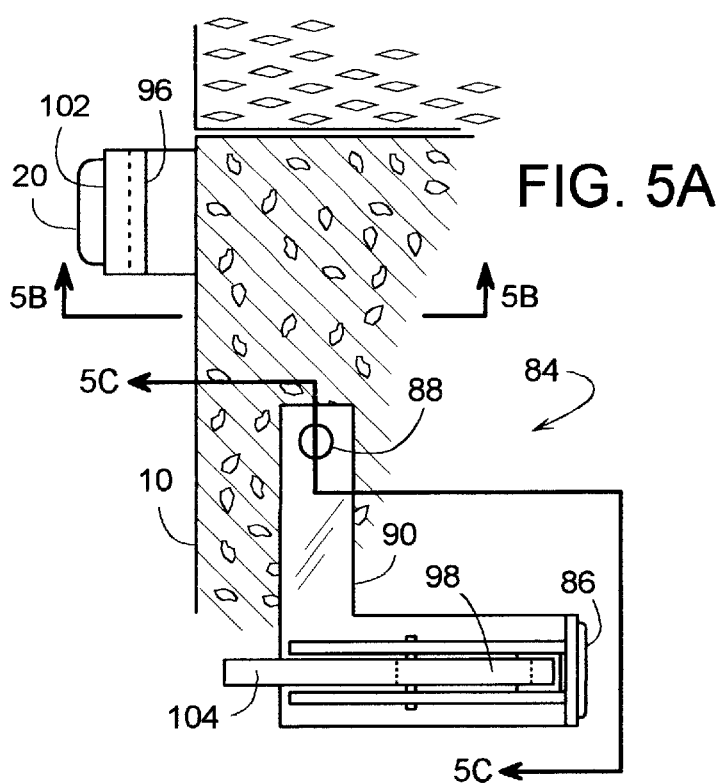
FIG. 5A is a top view of the embodiment of FIG. 4A, but with the bumper in a stored position.
Figure 5C:
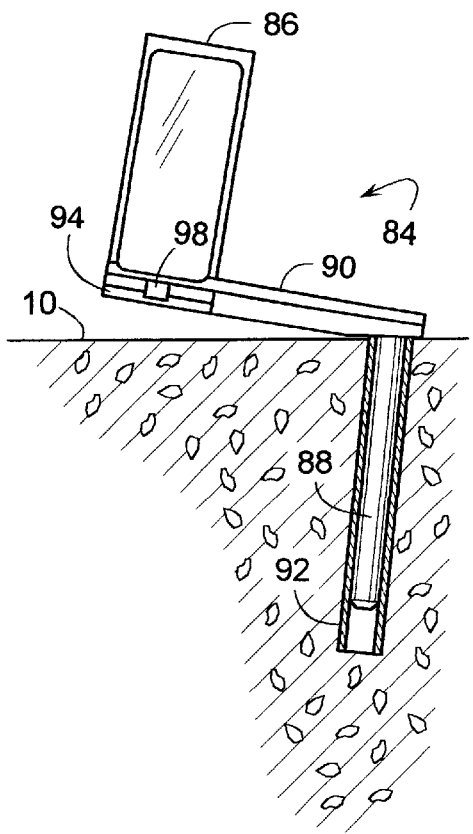
FIG. 5C is a cross-sectional view taken along line 5C—5C of FIG. 5A.
Figure 5B:
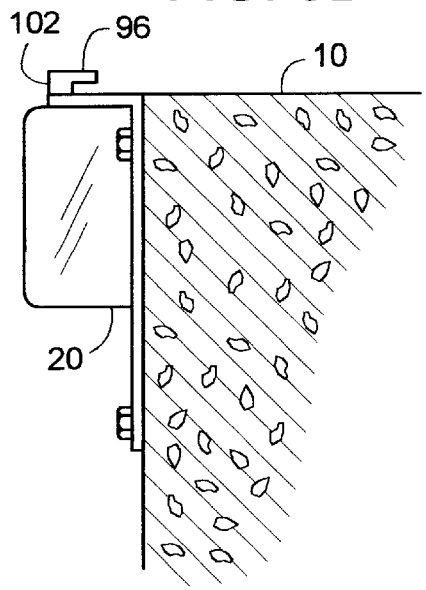
FIG. 5B is a cross-sectional view taken along line 5B—5B of FIG. 5A.

In an alternate embodiment, a bumper assembly 84 includes a bumper 86 that provides movement transverse to the bumper face by manually rotating between an operative position of FIGS. 4A–4C and a stored position of FIGS. 5A–5B, that is by rotation about an axis that is generally vertical (more vertical than horizontal). The rotation is provided by a pin 88 that extends downward from a base structure 90 and slips into a sleeve 92 that is embedded in dock 10 at a slight angle. The angle urges bumper 86 to swing towards its operative position of FIGS. 4A–4C. In moving to the operative position, a lip 94 extending from base 90 slips underneath a mating lip 96 that is fixed relative to dock 10. A latch 98 pivots about a pin 100 in base 90 to catch a forward surface 102 of lip 96. Lip 96 engaging latch 98 and lip 94 holds bumper 14 in its operative position.

Depressing a foot-receiving lever 104 that extends from latch 98 raises latch 98 against its own weight to disengage from surface 102. This allows bumper 86 to be manually rotated to its stored position of FIGS. 5A–5B. Thus, the release mechanism according to this embodiment comprises lever 104 and lip 96/surface 102. In the first, non-release configuration of FIG. 4B, the mechanism prevents bumper 86 from moving transversely to the bumper face. In the second, release configuration disengagement of lever 104 from surface 102 permits the transverse movement. Bumper 86 can be held in its stored position by virtue of the bumper's rotation simply being at its top-dead-center, or if desired, an obvious detent, stop, or latch can be provided at this position.

The use of bumper assembly 84 at its stored and operative positions is similar to that of bumper assembly 12.

Figure 6A:
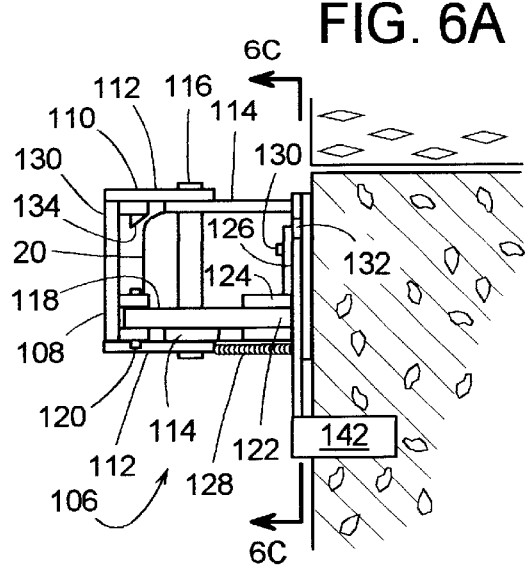
FIG. 6A is a top view of another embodiment of a moveable bumper in an operative position.
Figure 7A:
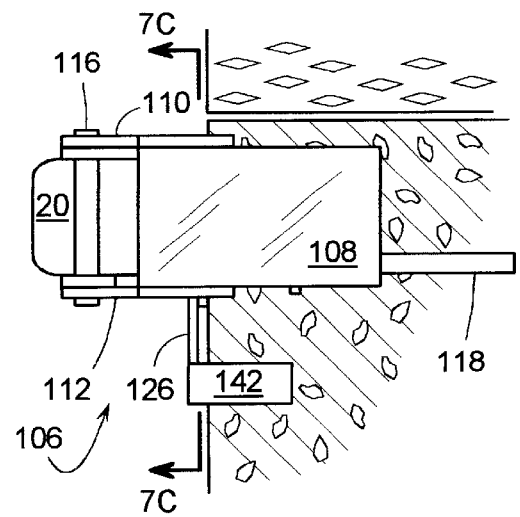
FIG. 7A is a top view of the bumper of FIG. 6A, but with the bumper shown in its stored position.
Figure 6B:
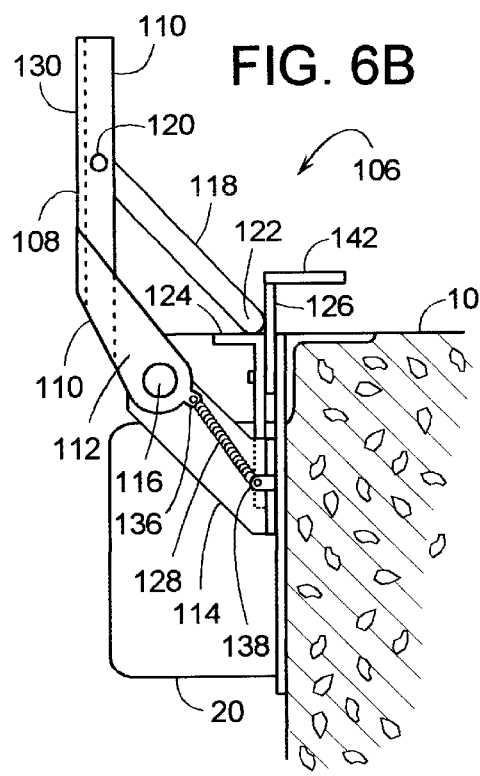
FIG. 6B is a front view of the bumper of FIG. 6A.
Figure 7B:
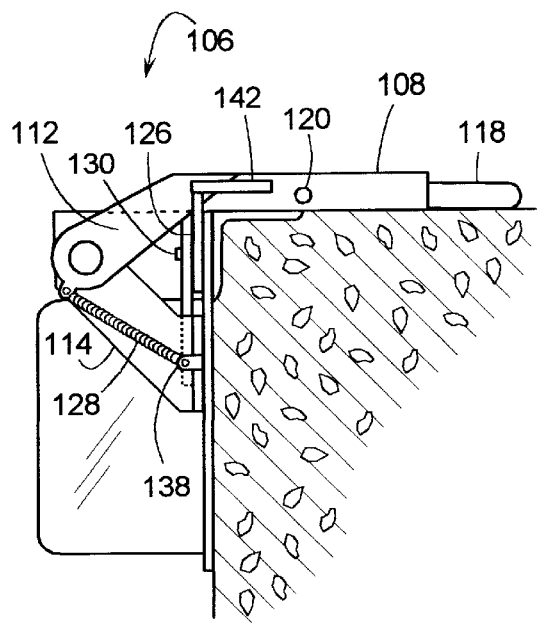
FIG. 7B is a front view of the bumper of FIG. 7A.
Figure 6C:
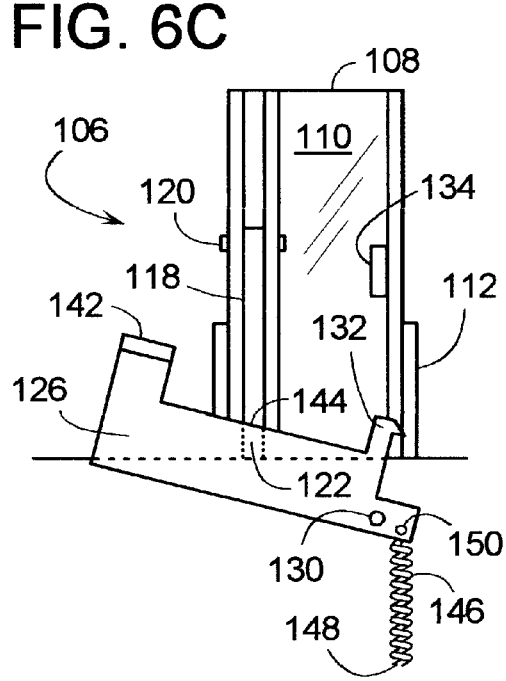
FIG. 6C is a cross-sectional view taken along line 6C—6C of FIG. 6A.
Figure 7C:
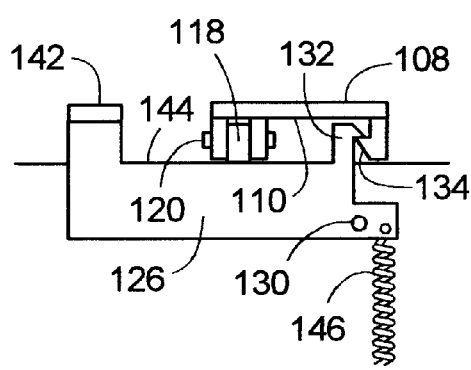
FIG. 7C is a cross-sectional view taken along line 7C—7C of FIG. 7A.

In another embodiment, a bumper assembly 106 includes a bumper 108 that provides movement transverse to the bumper face by manually rotating between an operative position of FIGS. 6A–6C and a stored position of FIGS. 7A–7C, that is, by movement of the bumper face between a generally vertical operative position and a generally horizontal stored position. A bumper mounting structure 110 includes two arms 112 that are rotatably pinned to a fixed bumper frame 114 via a pin 116. A brace 118 is pivotally connected to structure 110 by way of a pin 120. A lower end 122 of brace 118 rests atop a fixed L-shaped support plate 124 and engages a pivoting plate 126 (see FIG. 6C) to help hold bumper 108 in its raised operative position against the downward urging of a tension spring 128 and/or the pressure a vehicle or container pushing against an abutment face 130 of bumper 108.

Brace 118, however, can also tuck underneath structure 110 when bumper 108 is in its stored position. Upon bumper 108 moving to the stored position, plate 126 pivots about a fixed pin 130 to cause a latch 132 to engage a lip 134 on structure 110 (see FIG. 7C). Latch 132 engaging lip 134 holds bumper 108 in its stored position against the upward urging of spring 128.

Figure 8:
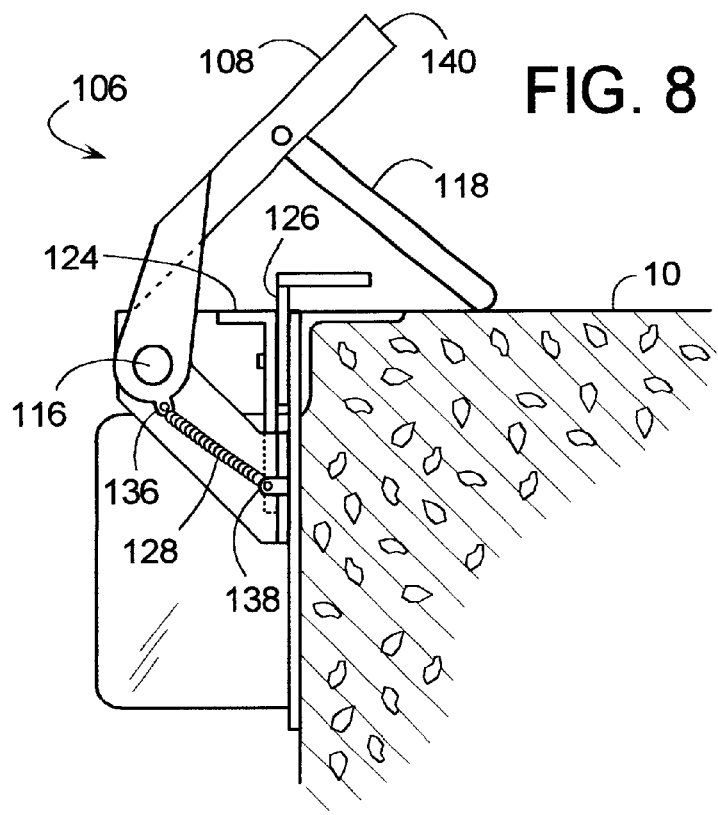
FIG. 8 is the same view as FIGS. 6B and 7B, but with the bumper shown in its retracted, equilibrium position.

Spring 128 is connected at points 136 and 138, which are positioned to provide bumper 108 with an equilibrium position, as shown in FIG. 8. Such an intermediate position prevents bumper 108 from slamming to either of its operative or stored positions. Thus, bumper 108 is manually moved from its intermediate position to its operative and stored positions by pushing up or down against an upper portion of bumper 108. In this embodiment, the upper portion of bumper 108 serves as a foot-receiving member 140.

To release bumper 108 from its operative position to its intermediate position, or to release bumper 108 from its stored position to its intermediate position, an operator depresses a foot-receiving member 142 that extends from plate 126. Depressing member 142 when bumper 108 is in its operative position (FIG. 6C) rotates plate 126 about pin 130 to lower an upper edge 144 of plate 126 below support plate 124. This allows lower end 122 of brace 118 to slide from support plate 124 and over onto dock platform 10, thus allowing spring 128 to pull bumper 108 down to its intermediate position. The release mechanism here thus includes plate 126 and brace 118. In the non-release configuration, engagement between brace 118 and plate 126 in the FIG. 6C position prevents transverse movement of the bumper 108. In the release configuration, plate 126 no longer forms an impediment to rearward movement of brace 118, and bumper 108 is thus permitted to also move rearwardly (i.e. in a direction transverse to the bumper face). Depressing member 142 when bumper 108 is in its stored position (FIG. 7C) rotates plate 126 about pin 130 to disengage latch 132 from lip 134. This allows spring 128 to pull bumper 108 up to its intermediate position. A tension spring 146 having one end 148 fixed and an opposite end 150 connected to plate 126 urges foot-receiving member 142 to a normally raised position. It should be noted that the material thickness of bumper 108 in its stored position may have an objectionable projection above dock platform 10. In that case platform 10 can be provided with a recess or depression (not shown) to allow bumper 108 to store with its upper surface in a flush relationship with dock surface 10.

Figure 9:
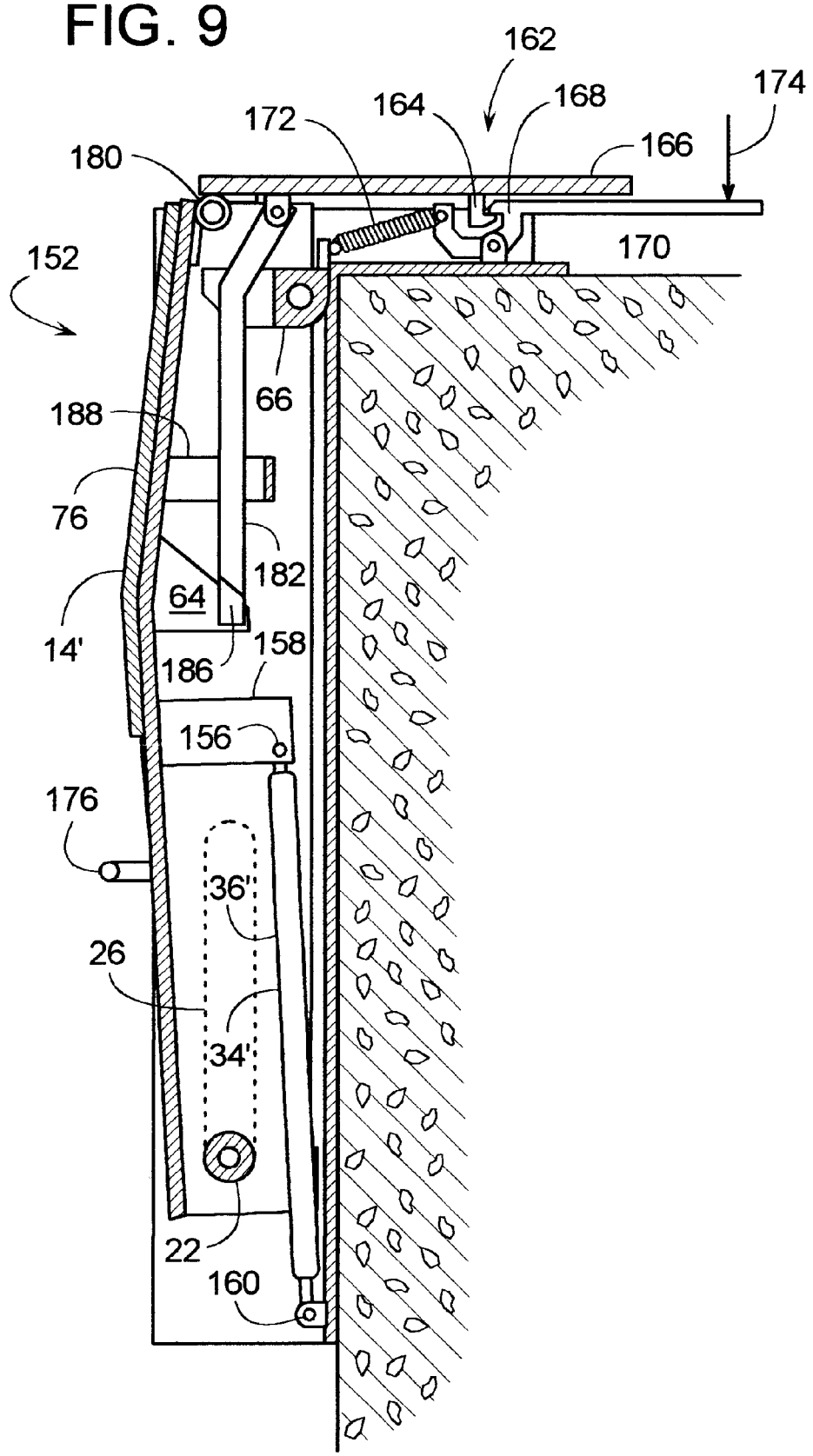
FIG. 9 is similar to FIG. 1B, but of another embodiment.
Figure 10:
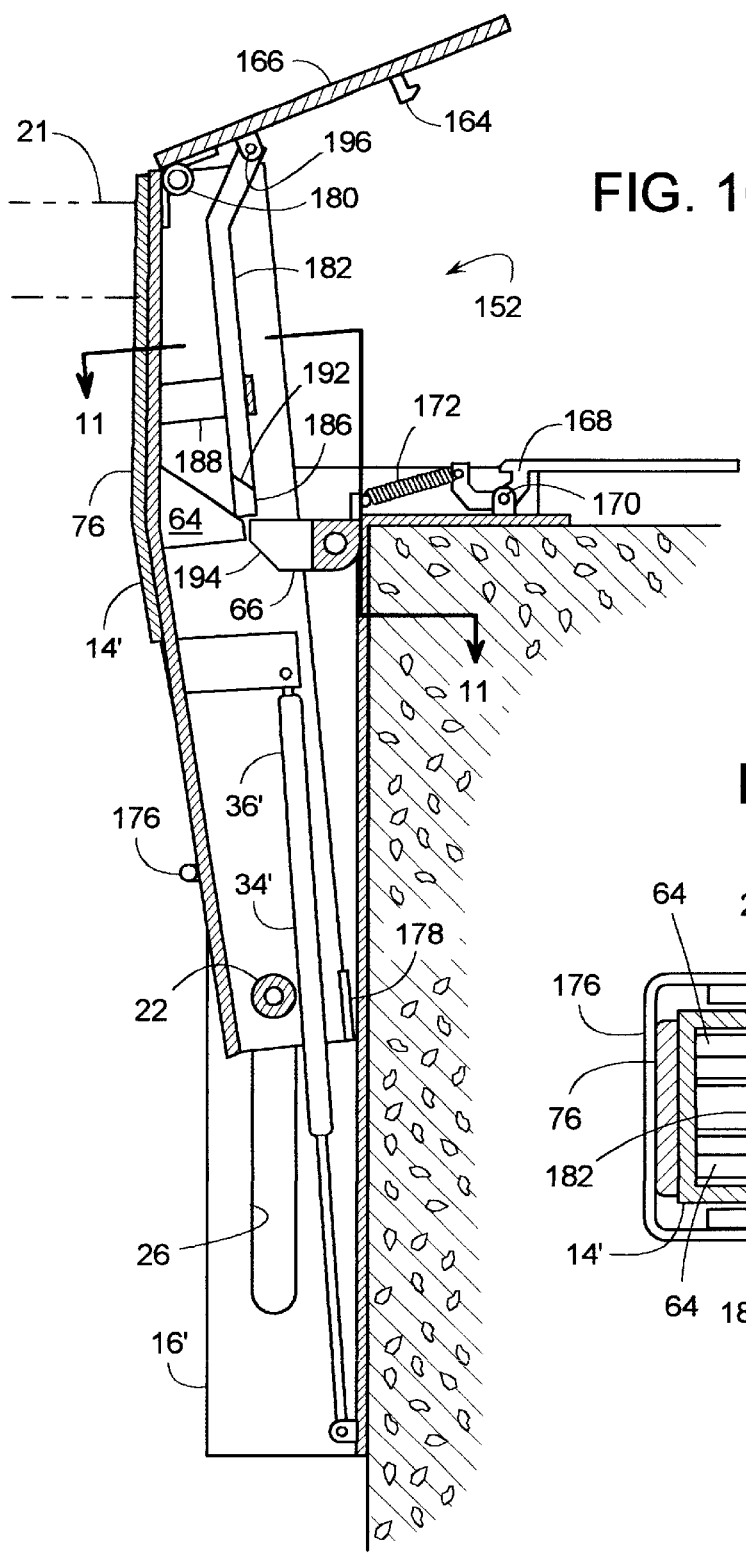
FIG. 10 is similar to FIG. 2B, but of another embodiment.
Figure 11:
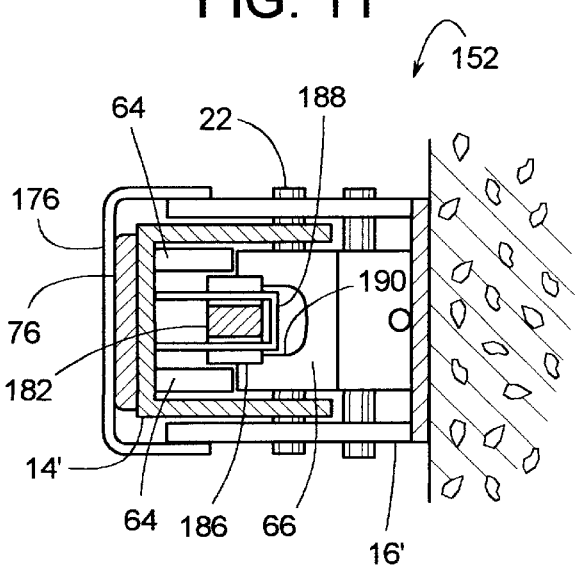
FIG. 11 is a cross-sectional view taken along line 11—11 of FIG. 10.
Figure 12:
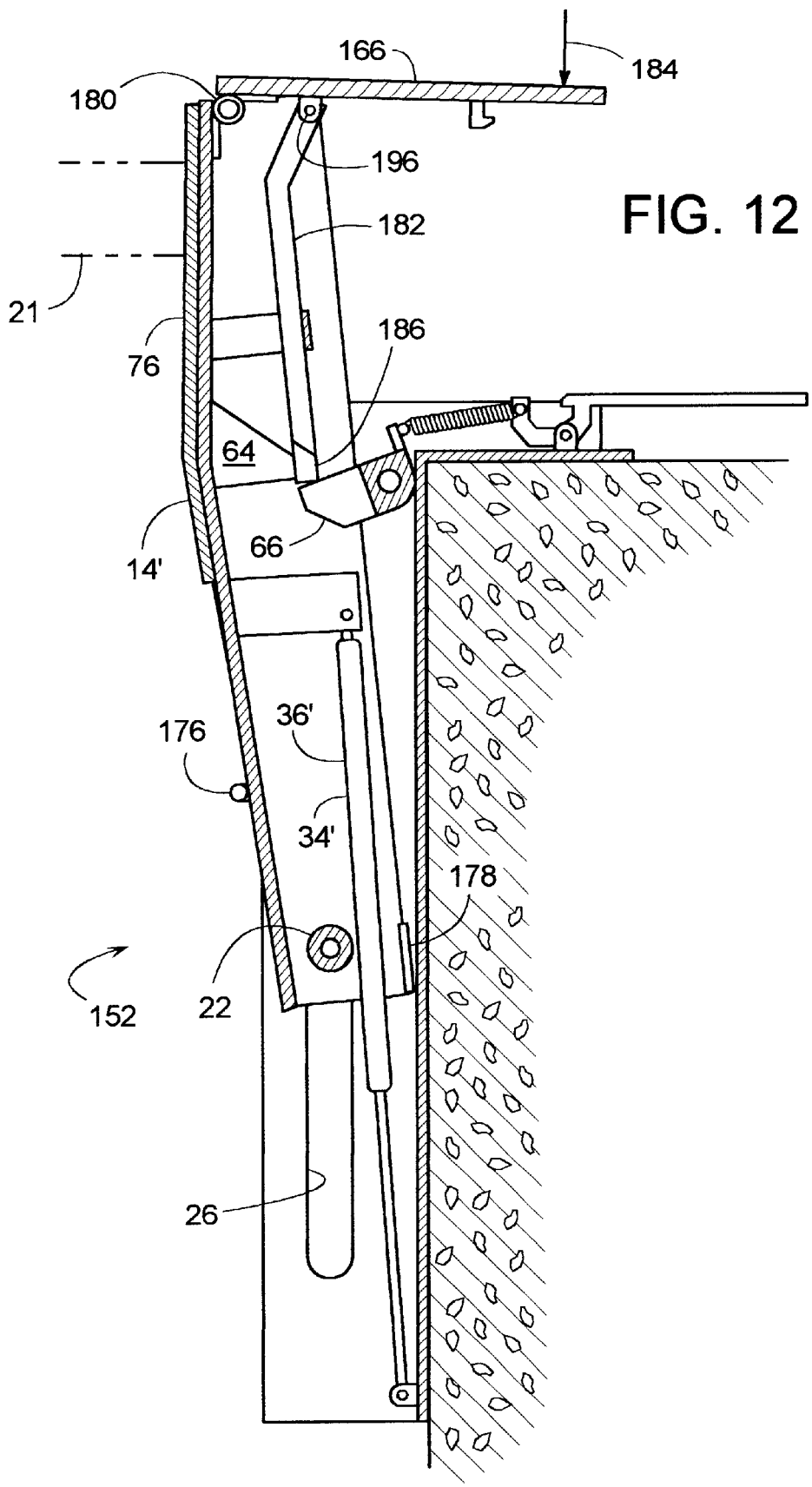
FIG. 12 is the same as FIG. 10, but with the bumper released.

FIGS. 9–12 illustrates a bumper assembly 152 that is similar to bumper assembly 12, but is provided with different actuation and latch/release mechanisms. FIG. 9. shows assembly 152 with a bumper 14' latched in a stored position; FIG. 10 and 11 illustrate a raised, operative position; FIG. 12 shows bumper 14' being released from its operative position; and FIG. 13 illustrates a retracted position.

To raise bumper 14' from its stored position of FIG. 9 to its raised position of FIG. 10, an actuator 34' such as a normally extended gas spring 36' is used. Gas spring 36' has one pin connection 156 on a lug 158 that is fixed relative to bumper 14' and has another pin connection 160 that is fixed relative to a frame 16'. Gas spring 36' urges pins 156 and 160 apart, thus urging bumper 14' upward.

To hold bumper 14' down at its stored position, against the urging of spring 36', a latch mechanism 162 is disposed near the upper end of bumper assembly 152. Latch mechanism 162 includes a catch 164 that is attached to a top plate 166 of bumper 154 and releasably engages a lever-actuated hook 168 that pivots about a pin 170. A tension spring 172 urges hook 168 to engage catch 164.

To release bumper 14' from its stored position of FIG. 9 and allow spring 36' to push bumper 14' up to its operative position of FIG. 10, lever-actuated hook 168 is pushed down, as indicated by arrow 174, which disengages latch mechanism 162. In this embodiment, pin 22 reaching the top of slot 26 limits the upward travel of bumper 14', thus eliminating the need for stops 70 and 72 of bumper assembly 12. It should be noted, that instead of pin 28 of bumper assembly 12, the outward pivotal motion of bumper 14' can be limited by a U-shaped bar 176 attached to frame 16' and a heal plate 178 attached to bumper 14'. The pivoting of bumper 14' can then be limited by bar 176 engaging bumper 14' or by heal plate 178 engaging frame 16'. It should also be noted that limiting a bumper's outward pivotal motion or upward travel in the manners just described could be applied to either bumper assembly 12 or 152.

Disengaging latch 162 also allows a spring-loaded hinge 180 to pivot upper plate 166 upward relative to bumper 14'. The upward pivotal motion of plate 166, in turn, lifts a push arm 182 that can later be used to help release bumper 14' from its operative position. For example, when truck 21 is exerting pressure against an abutment face 76 of bumper 14', the pressure tends to hold bumper 14' at its raised, operative position, thus making it difficult to move bumper 14' directly from its operative position to its stored position. To relieve the pressure, bumper 14' can be moved away from truck 21 in a direction that traverses abutment face 76 by first pushing down on top plate 166, as indicated by arrow 184 of FIG. 12. This pivots plate 166 about hinge 180, which pushes arm 182 downward. This, in turn, forces a butt 186 at a lower end of arm 182 to push down against block 66, thus pivoting block 66 counterclockwise, as viewed in FIG. 12. When the distal end of block 66 pivots below angled protrusion 64; bumper 14' is free to pivot about pin 22 from the bumper's operative position of FIG. 12 to its retracted position of FIG. 13. Upon doing so, angled protrusion 64 rides over the top of block 66, which pivots block 66 further downward and out of the way. Thus the release mechanism here comprises the same block 66 and protrusion 64 as in the similar embodiment of FIGS. 1–3. Movement of the block 66 to configure the release mechanism in the release configuration is facilitated by the operation of plate 166 and arm 182.

Once bumper 14' backs away from truck 21, bumper 14' can be readily pushed down from its retracted position of FIG. 13 back to its stored position of FIG. 9. This can be done manually by pushing down on top plate 166, or can be done automatically by an overhead door pushing down on plate 166 as the door descends to a closed position.

The actual design of push arm 182 can vary, however, in a preferred embodiment the upper portion of arm 182 is guided by a U-shaped guide 188 that is narrow enough to slip between a slot 190 in block 66, as shown in FIG. 11. The width of butt 186 can slip between the two angled protrusions 64, but is too wide for slot 190 of block 66. This allows butt 186 to recede between protrusions 64 as bumper 14' ascends from its stored to operative position. As bumper 14' ascends, an upper beveled portion 192 of butt 186 rides along a lower tapered portion 194 of block 66, which pushes butt 186 between protrusions 64. Butt 186 is preferably biased toward block 66 to ensure that butt 186 upon descending can engage the top of block 66 for releasing bumper 14' from its operative position. Such biasing can be readily accomplished by spring force or by gravity in conjunction with the shape and pivot location (e.g., point 196) of arm 182.

Although the invention is described with reference to a preferred embodiment, it should be appreciated by those skilled in the art that various modifications are well within the scope of the invention. Therefore, the scope of the invention is to be determined by reference to the claims that follow.

We claim:

1. A bumper assembly adapted to engage a cargo carrier at a loading dock platform, comprising:
    a frame attachable in a substantially fixed orientation relative to the dock platform;
    a bumper coupled to the frame for movement from an operative position to a retracted position and further moveable to a stored position below the operative position, wherein the bumper can extend above the dock platform in the operative position; and
    an abutment face disposed on the bumper and being adapted to engage the cargo carrier, wherein the abutment face is adapted to be engaged by the cargo carrier when the bumper is in the operative position and the abutment face is adapted to move away from the cargo carrier in a direction that traverses the abutment face as the bumper moves from the operative position to the retracted position.

2. The bumper assembly of claim 1, wherein the bumper is above the dock platform when the bumper is in the retracted position.

3. The bumper assembly of claim 1, wherein the bumper rotates about a substantially horizontal axis between the operative position and the retracted position.

4. The bumper assembly of claim 1, further comprising a latching mechanism to hold the bumper in a stored position below the operative position.

5. The bumper assembly of claim 4, wherein the latching mechanism triggers the bumper's movement from the stored position to the operative position.

6. The bumper assembly of claim 4, wherein the latching mechanism is foot-actuated.

7. The bumper assembly of claim 1, further comprising a foot-receiving member coupled to the bumper, wherein applying an appropriate force to the foot-receiving member moves the bumper between its operative position and its stored position.

8. The bumper assembly of claim 1, further comprising a power actuator coupled to the bumper to move the bumper between its operative position and its stored position, wherein the power actuator employs at least one of hydraulic actuation, pneumatic actuation, and electromotive actuation.

9. The bumper assembly of claim 1, wherein the bumper is urged to its operative position by at least one of mechanical spring force, gas spring force, and gravity.

10. A bumper assembly adapted to engage a cargo carrier at a loading dock platform, comprising:
    a frame attachable in a substantially fixed orientation relative to the dock platform; and
    a bumper coupled to the frame for movement from an operative position to a retracted position and further moveable to a stored position below the operative position, wherein the bumper can extend above the dock platform in both the operative position and in the retracted position, and
    an abutment face disposed on the bumper and being adapted to engage the cargo carrier, wherein the abutment face is adapted to receive the cargo carrier when the bumper is in the operative position and the abutment face is adapted to move away from the cargo carrier in a direction that traverses the abutment face as the bumper moves from the operative position to the retracted position.

11. The bumper assembly of claim 10, wherein the bumper is rotatable about an axis that traverses a horizontal plane.

12. The bumper assembly of claim 10, wherein the bumper moves generally linearly between the operative position and the stored position.

13. The bumper assembly of claim 10, wherein the bumper rotates about a substantially horizontal axis between the operative position and the stored position.

14. The bumper assembly of claim 10, further comprising a latching assembly to hold the bumper in a stored position below the operative position.

15. The bumper assembly of claim 14, wherein the latching mechanism triggers the bumper's movement from the stored position to the operative position.

16. The bumper assembly of claim 14, wherein the latching mechanism is foot-actuated.

17. The bumper assembly of claim 14, further comprising a foot-receiving member coupled to the bumper, wherein applying an appropriate force to the foot-receiving member moves the bumper between its operative position and its stored position.

18. The bumper assembly of claim 10, wherein the bumper is urged to its operative position by at least one of mechanical spring force, gas spring force, and gravity.

19. A method of receiving a cargo carrier at a loading dock platform, comprising:

positioning a bumper to an operative position above the loading dock platform where an abutment face of the bumper can be engaged by the cargo carrier;

retracting the bumper away from the cargo carrier in a direction that traverses the abutment face; and moving the bumper between the operative position and a stored position, wherein the stored position is lower than the operative position.

* * * * *

UNITED STATES PATENT AND TRADEMARK OFFICE
CERTIFICATE OF CORRECTION

PATENT NO. : 6,497,076 B1  
DATED : December 24, 2002  
INVENTOR(S) : Hans van de Wiel and Henk de Lang It is certified that error appears in the above-identified patent and that said Letters Patent is hereby corrected as shown below:

<u>Title page,</u>
Item [56], FOREIGN PATENT DOCUMENTS, please delete "685177" and insert -- 685117 --.

Signed and Sealed this

Twenty-seventh Day of May, 2003

JAMES E. ROGAN
*Director of the United States Patent and Trademark Office*